US012785021B2

(12) United States Patent
Dagen et al.

(10) Patent No.: US 12,785,021 B2
(45) Date of Patent: Nov. 3, 2026

(54) SYSTEM AND METHOD FOR CREATING A VACUUM IN AN X-RAY TUBE

(71) Applicant: GE Precision Healthcare LLC, Wauwatosa, WI (US)

(72) Inventors: Ryan Randall Dagen, Sullivan, WI (US); Evan M. Lampe, Franklin, WI (US)

(73) Assignee: GE Precision Healthcare LLC, Wauwatosa, WI (US)

(*) Notice: Subject to any disclaimer, the term of this patent is extended or adjusted under 35 U.S.C. 154(b) by 841 days.

(21) Appl. No.: 17/957,135

(22) Filed: Sep. 30, 2022

(65) Prior Publication Data

US 2024/0112876 A1 Apr. 4, 2024

(51) Int. Cl.
*H01J 9/385* (2006.01)
*H01J 35/16* (2006.01)

(52) U.S. Cl.
CPC .............. *H01J 9/385* (2013.01); *H01J 35/16* (2013.01); *H01J 2209/26* (2013.01); *H01J 2209/383* (2013.01)

(58) Field of Classification Search
CPC .................................................. H01J 2209/383
See application file for complete search history.

(56) References Cited

U.S. PATENT DOCUMENTS 3,846,006 A * 11/1974 Atlee .................... H01J 35/064 445/35
5,340,122 A * 8/1994 Toboni ..................... F16J 15/43 378/123
5,722,870 A * 3/1998 Raber .................... B23K 20/14 228/234.1
6,134,300 A * 10/2000 Trebes ................. A61N 5/1001 378/123
6,353,658 B1 * 3/2002 Trebes ................. A61N 5/1001 378/123

(Continued)

FOREIGN PATENT DOCUMENTS

DE 10319548 B3 * 10/2004 ............ H01J 35/165
EP 0009946 A1 4/1980
WO 2007000971 A1 1/2007

OTHER PUBLICATIONS

English translation of DE-10319548. (Year: 2004).*

(Continued)

*Primary Examiner* — Uzma Alam
*Assistant Examiner* — Soorena Kefayati

(57) ABSTRACT

X-ray tube systems and methods are described herein. A system for creating a vacuum environment in an X-ray tube assembly includes a vacuum tube having a first end and a second end, the first end of the vacuum tube welded to a support plate of the X-ray tube assembly, and the second end of the vacuum tube is pinched off or cold pressed to seal the vacuum environment within the X-ray tube insert of the X-ray tube assembly. A method of creating a vacuum within an X-ray tube assembly includes welding a first end of a vacuum tube to a support plate of the X-ray tube assembly, coupling a second end of the vacuum tube to a vacuum pump, using a vacuum pump to create a vacuum environment in the X-ray tube assembly and pinching off the second end of vacuum tube to seal the vacuum environment.

19 Claims, 10 Drawing Sheets

(56) References Cited

U.S. PATENT DOCUMENTS

| | | | | |
|---|---|---|---|---|
| 6,445,769 | B1 * | 9/2002 | Panasik | H01J 35/106 378/141 |
| 2004/0091080 | A1 * | 5/2004 | Garewal | H01J 35/30 378/119 |
| 2005/0213711 | A1 * | 9/2005 | Ukita | H01J 35/12 378/141 |
| 2006/0034425 | A1 * | 2/2006 | Unger | H01J 35/10 378/125 |
| 2009/0154651 | A1 * | 6/2009 | Okada | H01J 35/16 378/138 |
| 2009/0268873 | A1 * | 10/2009 | Inazuru | H01J 35/16 378/140 |
| 2009/0279667 | A1 * | 11/2009 | Rogers | H01J 35/16 378/123 |
| 2012/0106713 | A1 * | 5/2012 | Parker | H01J 35/165 174/358 |
| 2014/0029729 | A1 * | 1/2014 | Kucharczyk | H01J 35/106 378/123 |
| 2015/0078511 | A1 * | 3/2015 | Tang | H01J 35/065 378/111 |
| 2015/0155126 | A1 * | 6/2015 | Balakin | A61N 5/1077 250/424 |
| 2016/0211105 | A1 * | 7/2016 | Smith | H01J 9/385 |
| 2017/0110283 | A1 * | 4/2017 | Shirota | H01J 35/30 |
| 2018/0376574 | A1 * | 12/2018 | Rogers | H01J 35/065 |
| 2021/0217575 | A1 * | 7/2021 | Al-Sadah | H01J 35/112 |

OTHER PUBLICATIONS

JP application 2023-141892 filed Sep. 1, 2023—office action issued Nov. 6, 2024; Machine Translation; 5 pages.

EP application 23198191.1 filed Sep. 19, 2023—Search Report issued Jun. 19, 2024; 13 pages.

Lang Stefan: "Innendruckmessung an der Megalix TM—Drehanodenrontgenrohre", Aug. 16, 2007, XP093123788; Retrieved from the Internet: URL:https://opus4.kobv.de/opus4-hof/files/8/Dipl._Arbeit.pdf; 93 pages.

* cited by examiner

SYSTEM AND METHOD FOR CREATING A VACUUM IN AN X-RAY TUBE

TECHNICAL FIELD

Embodiments of the subject matter disclosed herein relate to systems for X-ray tube assemblies and methods for assembling X-ray tube assemblies.

BACKGROUND

X-ray tube assemblies include a vacuum environment in an X-ray tube insert. The vacuum environment is created during manufacture of an X-ray tube assembly. The vacuum environment is created using a vacuum tube, which extends from the X-ray tube insert. The vacuum tube is fixed to a surface of an opening of the X-ray tube insert, and is pinched off after the X-ray tube insert reaches a vacuum state during manufacture. However, this can result in significant waste of copper materials and/or can make repairs or refurbishing an X-ray tube assembly difficult.

SUMMARY

This summary introduces concepts that are described in more detail in the detailed description. It should not be used to identify essential features of the claimed subject matter, nor to limit the scope of the claimed subject matter.

In an aspect, an apparatus for creating a vacuum environment includes a vacuum tube having a first end and a second end, a socket coupled to the first end of the vacuum tube, and an adapter coupled to the second end of the vacuum tube.

In an aspect, a method of manufacturing an X-ray tube includes brazing a first end of a vacuum tube to a socket, attaching the vacuum tube to a base of an anode using the socket, attaching an adapter to a second end of the vacuum tube, using a vacuum pump coupled to the adapter to create a vacuum environment in the vacuum tube and anode, and pinching off the vacuum tube adjacent to the second end of the vacuum tube to seal the vacuum environment.

In an aspect, a system for creating a vacuum in an X-ray tube insert of an X-ray tube, comprising an X-ray tube insert; a vacuum tube having a first end and a second end, the first end coupled to the X-ray tube insert; a socket to couple the first end of the vacuum tube to the X-ray tube insert; an extension tube, the second end of the vacuum tube coupled to the extension tube; an adapter to couple the second end of the vacuum tube to the extension tube; and a vacuum pump to create the vacuum in the X-ray tube insert, the vacuum pump coupled to the extension tube.

In an aspect, a method of creating a vacuum within an X-ray tube insert, comprising attaching a first end of a vacuum tube to a socket; attaching the socket to a support plate of the X-ray tube insert; attaching an adapter to a second end of the vacuum tube; using a vacuum pump coupled to the adapter to create a vacuum environment in the X-ray tube insert; and pinching off the vacuum tube between the socket and the adapter to seal the vacuum environment.

In an aspect, an X-ray tube, comprising an X-ray tube enclosure; an X-ray tube insert positioned within the X-ray tube enclosure, the X-ray tube insert including a cathode assembly and an anode assembly; a support plate coupled between the cathode assembly and the anode assembly; a vacuum tube coupled to the support plate of the X-ray tube insert, wherein the X-ray tube insert includes a vacuum environment, and wherein the vacuum tube is pinched or cold pressed to seal the vacuum environment within the X-ray tube insert.

BRIEF DESCRIPTION OF THE DRAWINGS

The present disclosure will be better understood from reading the following description of non-limiting embodiments, with reference to the attached drawings, wherein below.

DETAILED DESCRIPTION

The following description relates to various embodiments of systems (e.g., X-ray imaging systems) and X-ray tubes deployed therein. The X-ray tube includes an X-ray tube insert that is positioned within an X-ray casing or enclosure (not shown) of the X-ray tube. A vacuum is created in the X-ray tube insert during manufacture of the X-ray tube. To create the vacuum, a first end of the vacuum tube is connected to a support plate or center frame of the X-ray tube insert. A second end of the vacuum tube is connected, via a connecting tube or extension tube, to a vacuum pump. The vacuum pump is used to create a vacuum within the X-ray tube insert. Once at vacuum, the vacuum tube is then pinched off to seal the vacuum environment of the X-ray tube insert. In an alternative embodiment, the first end of the vacuum tube is connected to a support plate or center frame of the X-ray tube insert, and the second end of the vacuum tube is connected to the vacuum pump, without the connecting tube or extension tube.

In some examples, a socket is used to connect the first end of the vacuum tube to the support plate. Additionally, an adapter may be used to couple the second end of the vacuum tube to a first end of the extension tube. In some examples, a second end of the extension tube is coupled to the vacuum pump using a fitting having a plurality of fasteners.

Figure 1:
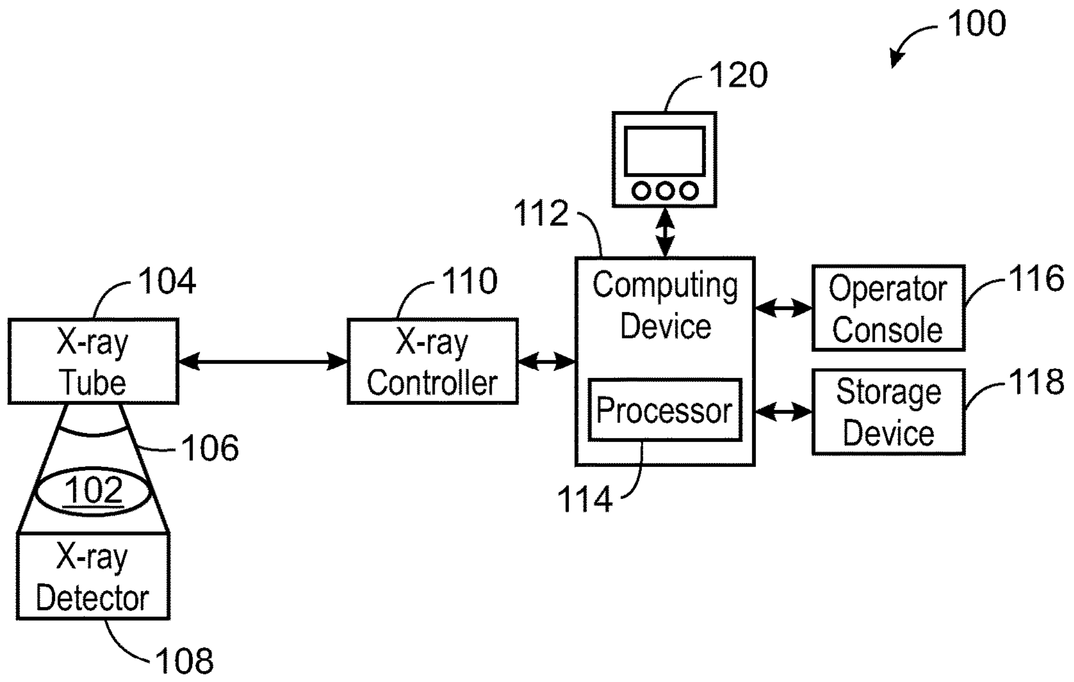
FIG. 1 shows a block schematic diagram of an exemplary X-ray system, according to an embodiment.
Figure 2:
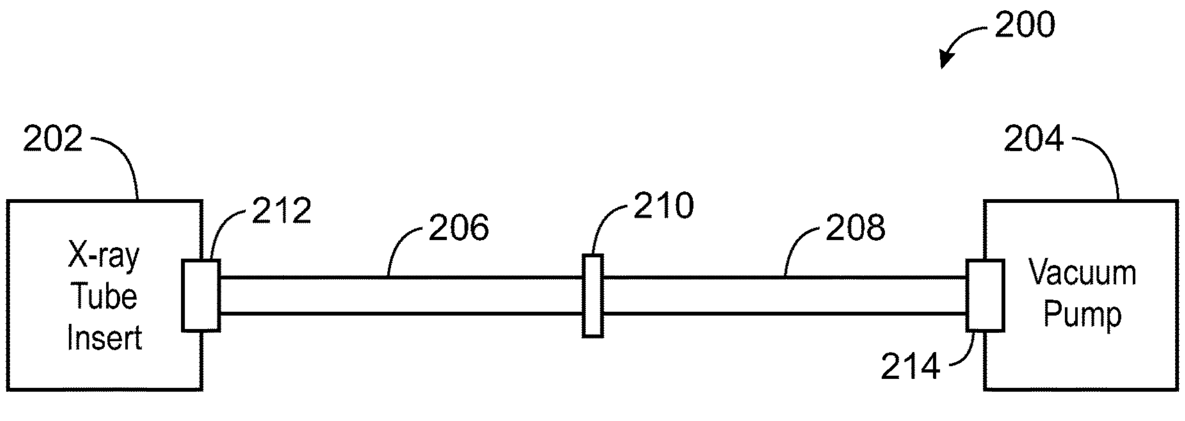
FIG. 2 shows a schematic of a vacuum processing assembly used to create a vacuum environment in an X-ray tube insert of an example X-ray tube.
Figure 3A:
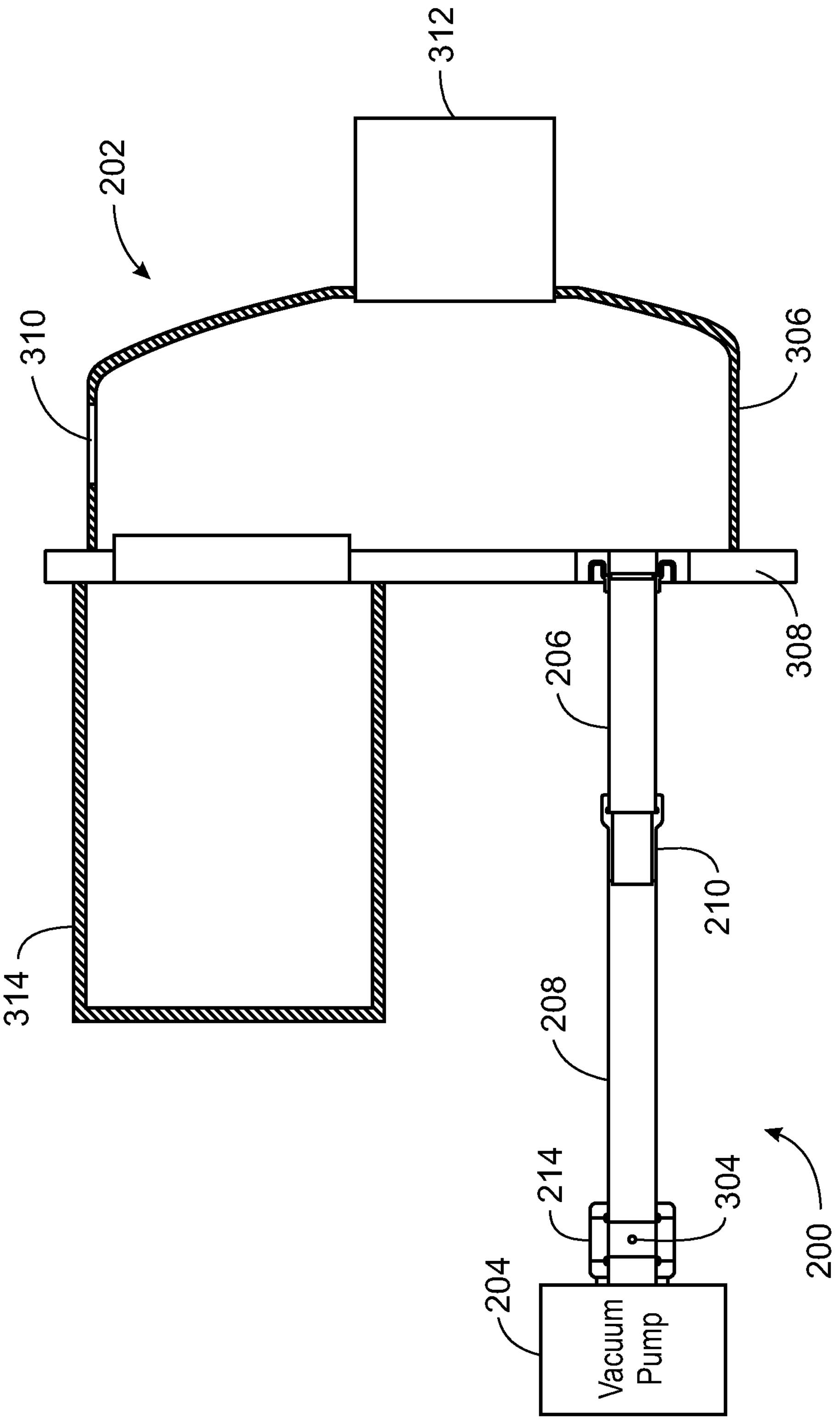
FIGS. 3A and 3B show partial cross-sectional views of example embodiments of the X-ray tube insert of the example X-ray tube coupled to an example vacuum processing assembly.
Figure 3B:
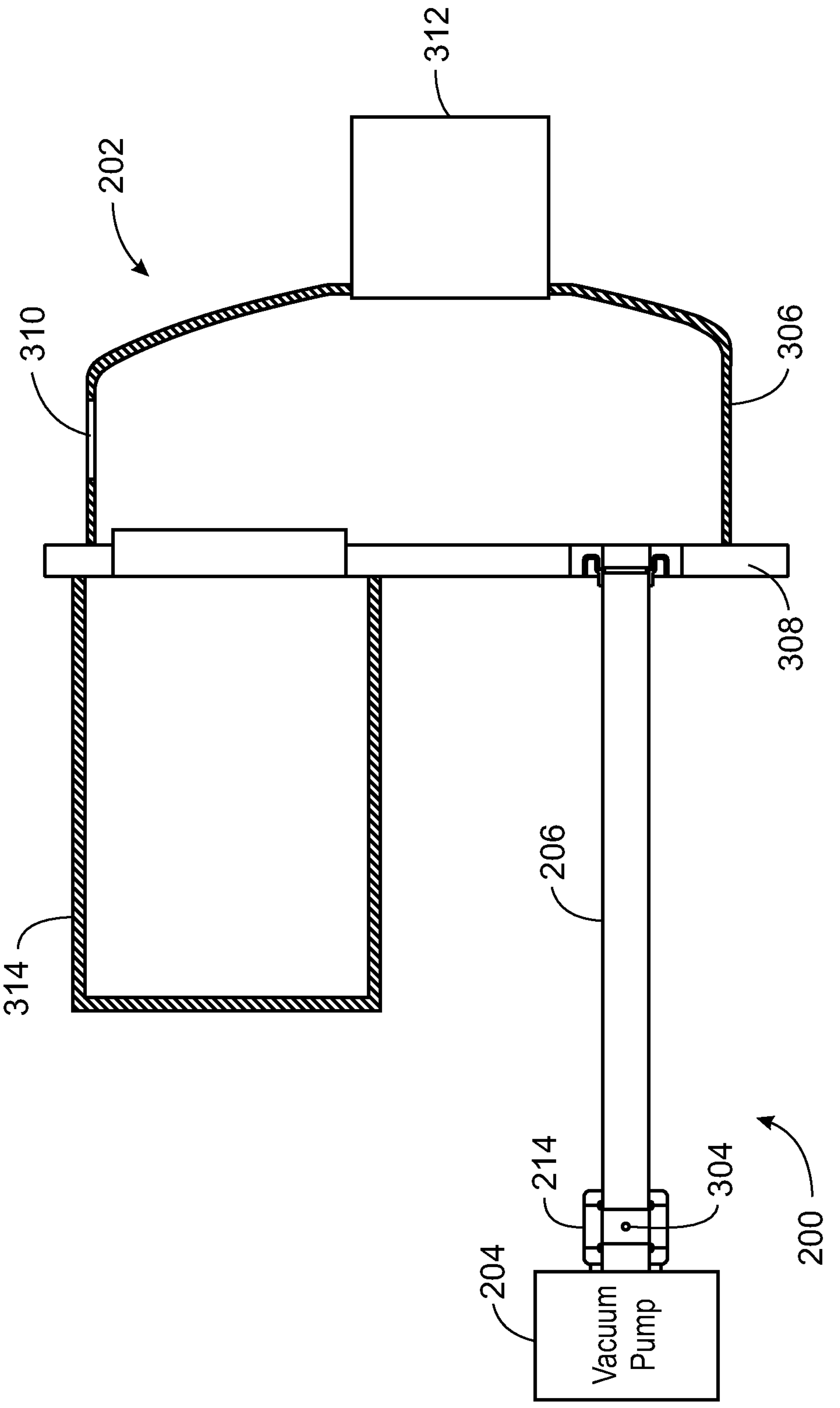
Figure 4:
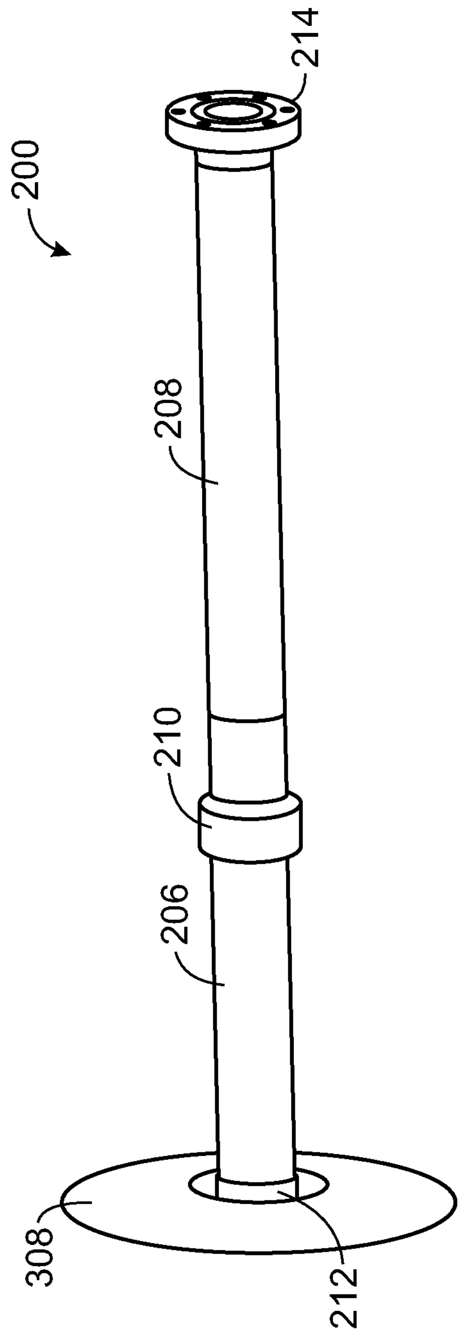
FIG. 4 shows certain components of the example vacuum processing assembly for creating a vacuum in an X-ray tube insert of an X-ray tube.
Figure 6:
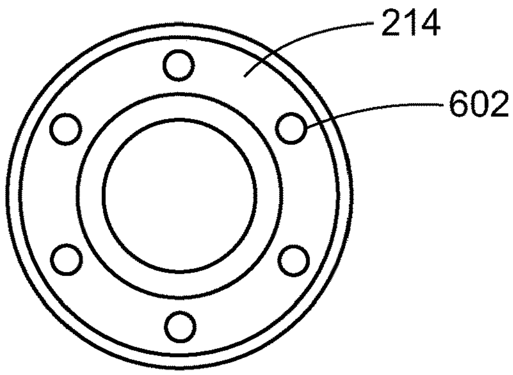
FIG. 6 depicts a first end of an example extension tube, including an example fitting.
Figure 7:
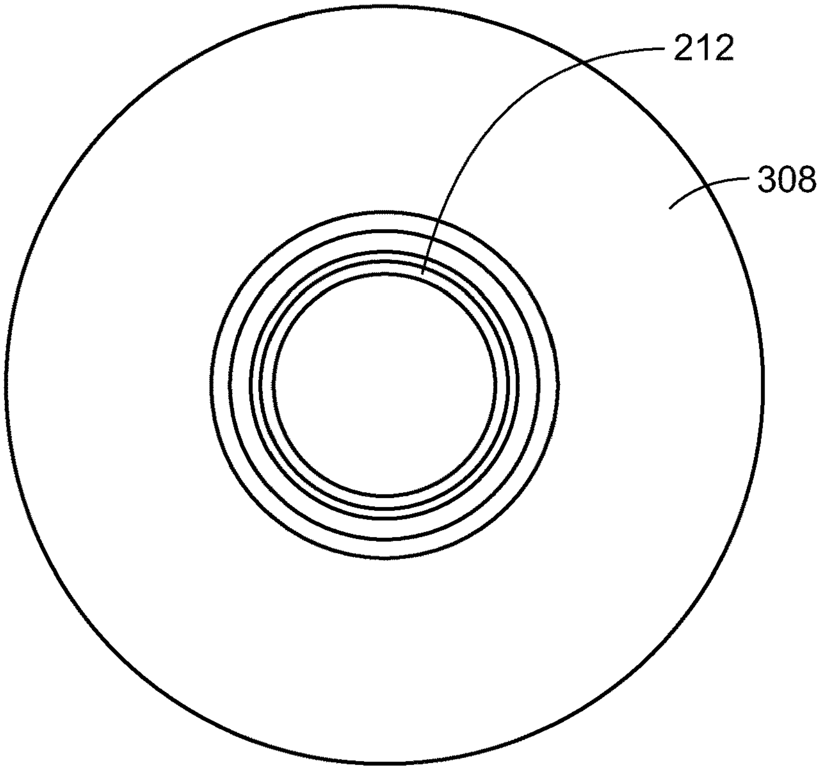
FIG. 7 depicts a first end of an example vacuum tube and the socket to connect the vacuum tube to a support plate of the X-ray tube insert.
Figure 8A:
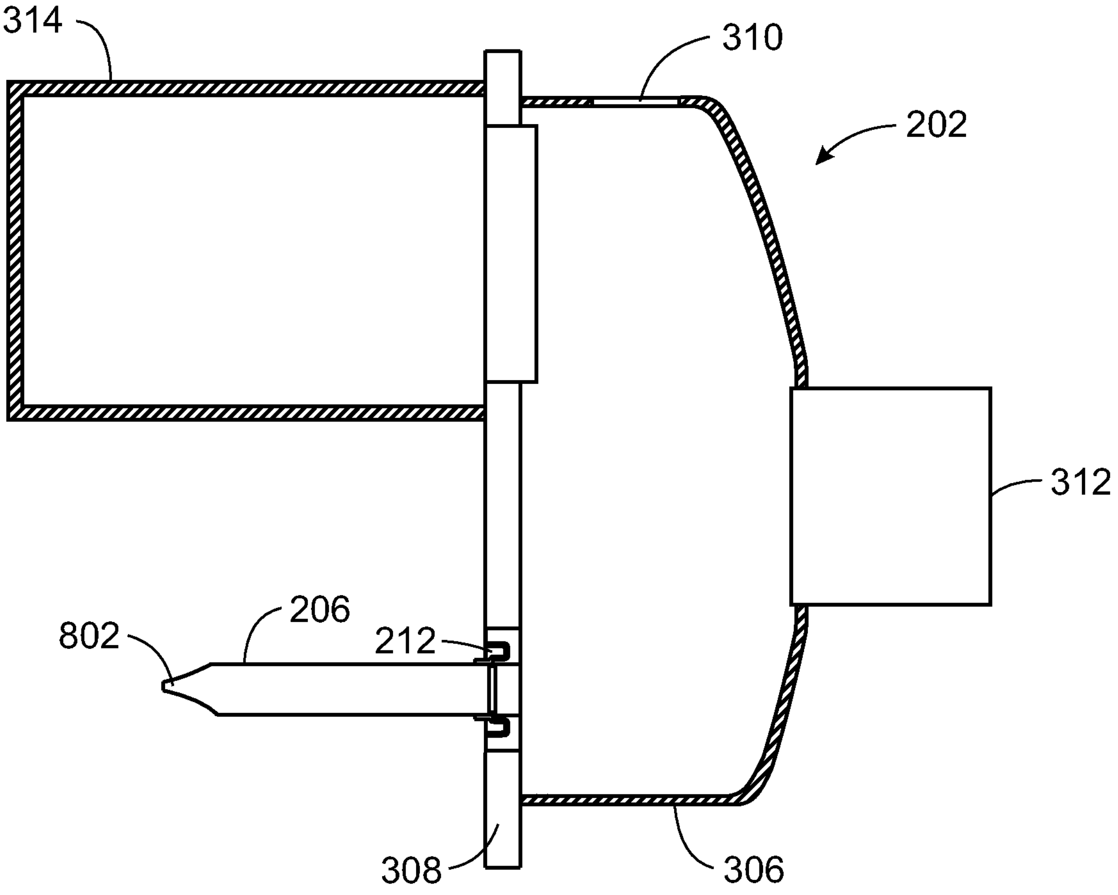
FIGS. 8A and 8B depict embodiments of an example vacuum tube connected to the X-ray tube insert that has been pinched off after a vacuum is created in the X-ray tube insert.
Figure 8B:
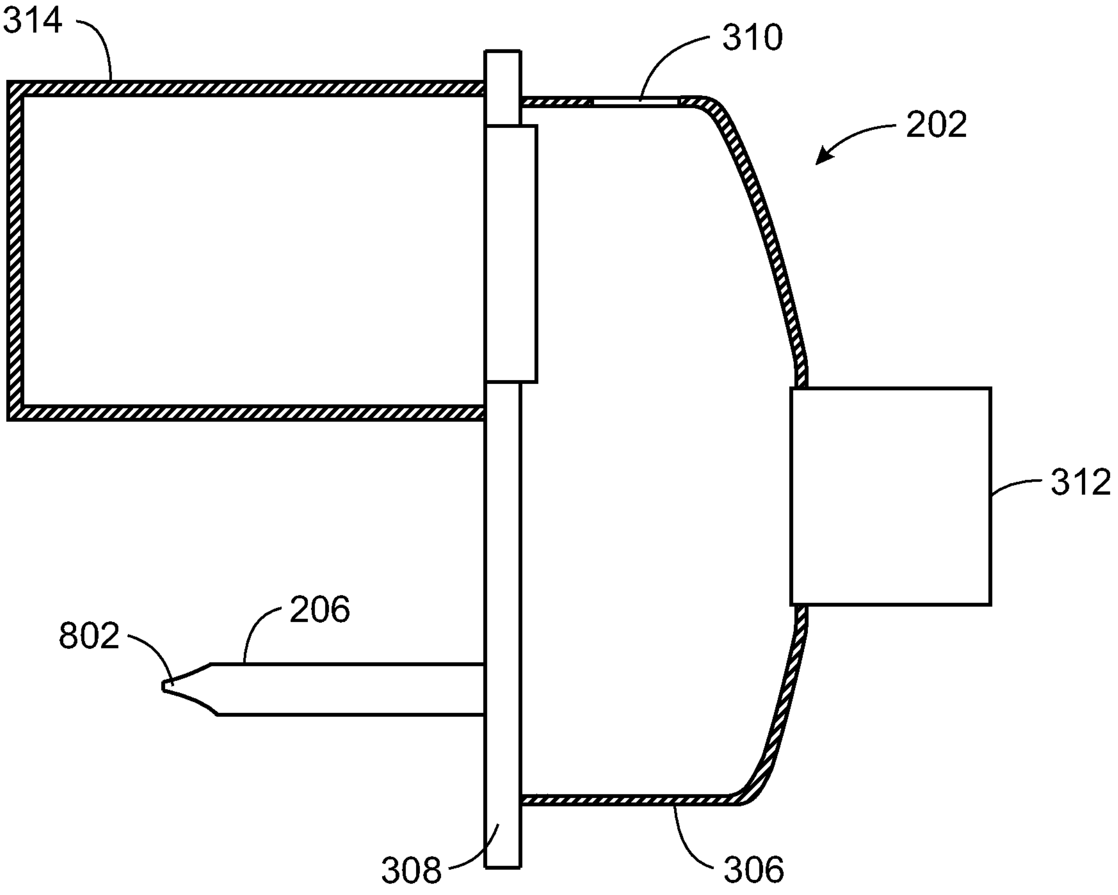
Figure 9:
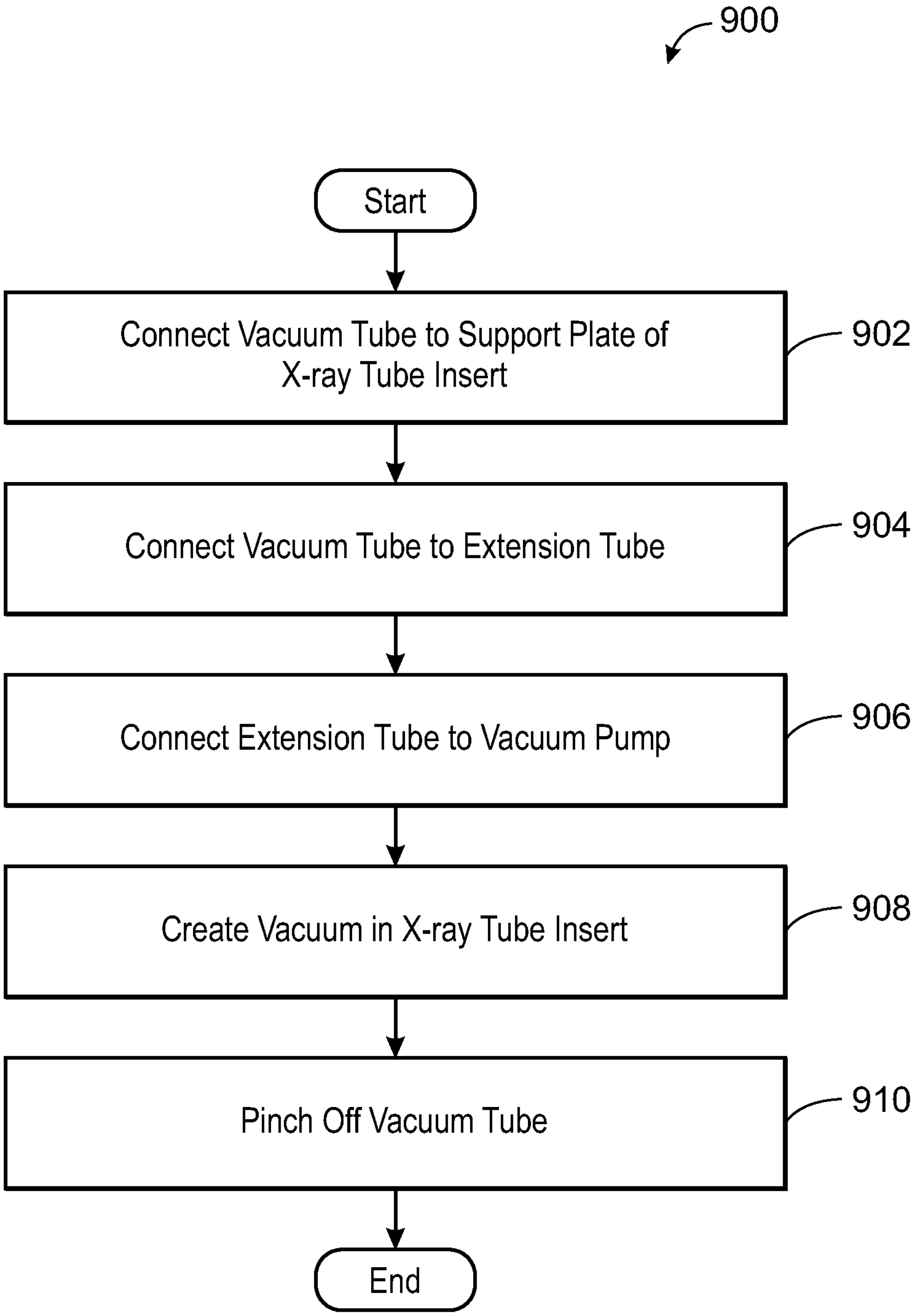
FIG. 9 depicts a method of creating a vacuum in the example X-ray tube insert.
Figure 10:
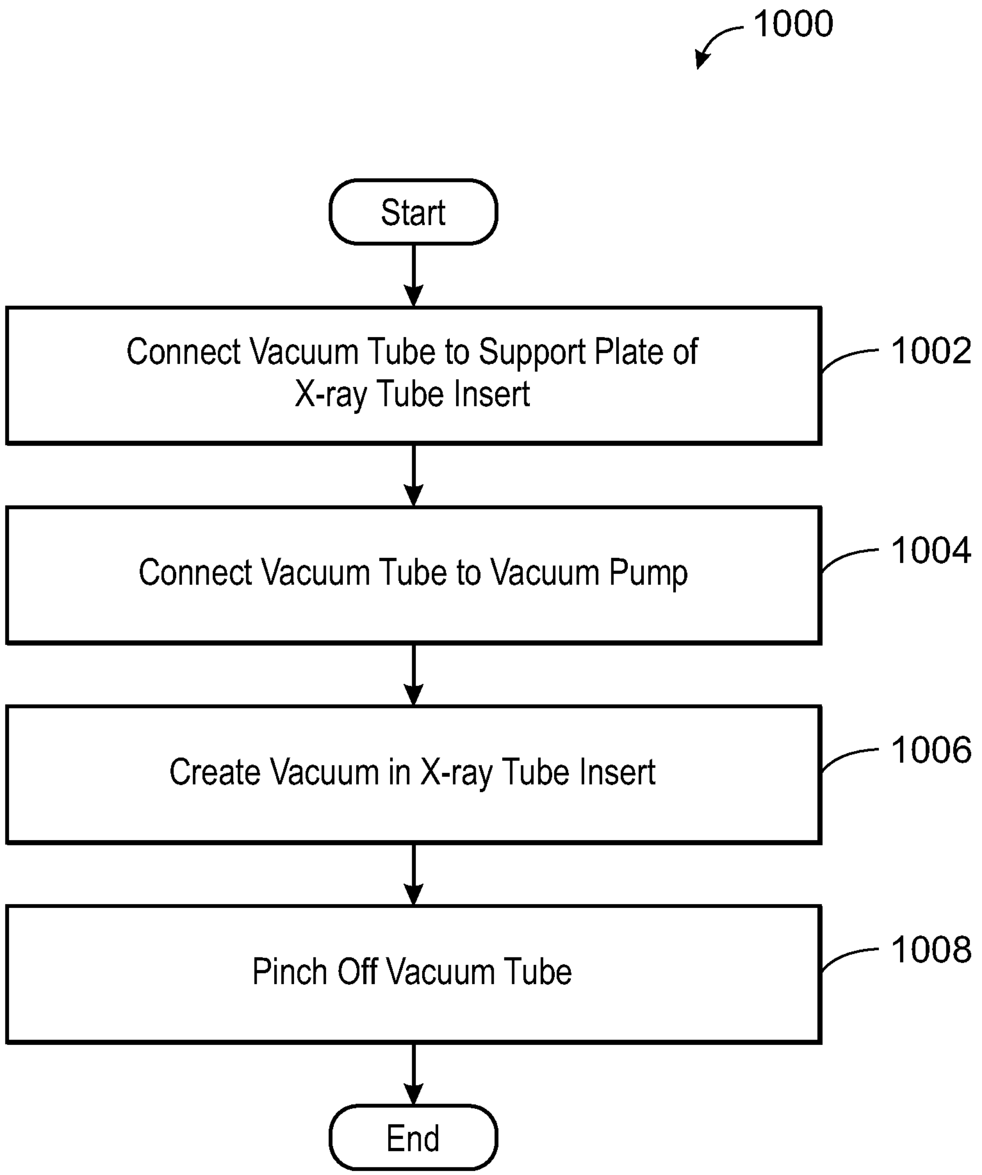
FIG. 10 depicts an alternative method of creating a vacuum in the example X-ray tube insert.

An X-ray system is shown in FIG. 1 and includes an X-ray tube that is coupled to an X-ray controller that functions to generate X-rays. FIG. 2 shows a general schematic of a vacuum processing assembly used to create a vacuum environment in an X-ray tube insert of an X-ray tube. FIGS. 3A and 3B shows a partial cross-sectional view of one embodiment of the example X-ray tube insert of the example X-ray tube coupled to an example vacuum processing assembly for creating the vacuum environment. FIG. 4 shows certain components of an example embodiment of the vacuum processing assembly coupled to a support plate or center frame of an example X-ray tube insert for creating a vacuum in the example X-ray tube insert of the example X-ray tube. FIG. 5 shows cross-sectional view of the example tube assembly of FIG. 4 FIG. 6 depicts a first end of an example extension tube, which includes a fitting to connect the extension tube to the vacuum pump. FIG. 7 depicts a first end of the example vacuum tube and a socket to connect the vacuum tube to the support plate of the X-ray tube insert. FIGS. 8A and 8B depict examples of a vacuum tube connected to the X-ray tube insert that has been pinched off after the vacuum is created in the X-ray tube insert. FIG. 9 depicts a method of creating a vacuum in the example X-ray tube insert. FIG. 10 depicts an alternative method of creating a vacuum in the example X-ray tube insert.

FIGS. 2-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a “top” of the component and a bottommost element or point of the element may be referred to as a “bottom” of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 illustrates an X-ray system 100 designed to generate X-rays to image a subject or an object 102. The X-ray system 100 may be configured as an imaging system (e.g., computed tomography (CT) system, radiography system, fluoroscopy system, interventional system, tomography system, etc.) in FIG. 1. However, the X-ray system 100 has applicability to fields beyond imaging, medical devices, and the like. For instance, the X-ray system 100 may be deployed in crystallography systems, security scanners, industrial scanners, non-destructive testing applications, X-ray photography systems, and so on. In the imaging system example, the X-ray system 100 may be configured to image an object or subject 102 such as a patient, an inanimate object, baggage, pipelines, one or more manufactured parts, and/or foreign objects.

The X-ray system 100 may include at least one X-ray tube 104 configured to generate and project a beam of X-ray radiation 106 towards a subject or object 102 to be imaged. Specifically, in the illustrated embodiment, the X-ray tube 104 is configured to project the X-ray radiation beam 106 towards an X-ray detector 108 and through the subject 102. In some system configurations, the X-ray tube 104 may project a fan-shaped or a cone-shaped X-ray radiation beam which is collimated to lie within an X-Y-Z plane of a Cartesian coordinate system. However, other beam profiles and/or systems have been envisioned. Each detector element of the X-ray detector 108 produces a separate electrical signal that is a measurement of the X-ray beam attenuation at the detector element location.

Although FIG. 1 depicts only a single X-ray tube 104 and X-ray detector 108, in certain embodiments, multiple X-ray tubes, and/or X-ray detectors may be employed to project a plurality of X-ray radiation beams and detect said beams. For instance, in the CT machine use-case example, multiple detectors may be used in tandem with the X-ray tubes to acquire projection data at different energy levels corresponding to the subject.

The X-ray system 100 may further include an X-ray controller 110 or an X-ray generator configured to provide power and/or timing signals to the X-ray tube 104. It will be understood that that system may also include a data acquisition system configured to sample analog data received from the X-ray detector elements and convert the analog data to digital signals for subsequent processing.

In certain embodiments, the X-ray system 100 may further include a computing device 112 having a processor 114 and controlling system operations based on operator input. The computing device 112 receives the operator input, for example, including commands and/or scanning parameters via an operator console 116 operatively coupled to the computing device 112. The operator console 116 may include a keyboard, a touchscreen, and/or other suitable input device (not shown) allowing the operator to specify the commands and/or scanning parameters.

Although FIG. 1 illustrates only one operator console 116, more than one operator console may be included in the X-ray system 100, for example, for inputting or outputting system parameters, requesting examinations, plotting data, and/or viewing images. Further, in certain embodiments, the X-ray system 100 may be coupled to multiple displays, printers, workstations, and/or similar devices located either locally or remotely, for example, and connected via wired and/or wireless networks. In one embodiment, a display 120 may be in electronic communication with the computing device 112 and may be configured to display graphical interfaces indicating system parameters, control settings, imaging data, etc.

In one example, the computing device 112 stores the data in a storage device 118. The storage device 118, for example, may include a hard disk drive, a floppy disk drive, a compact disk-read/write (CD-R/W) drive, a Digital Versatile Disc (DVD) drive, a flash drive, and/or a solid-state storage drive, or other type of suitable storage device.

Additionally, the computing device 112 provides commands to the X-ray controller 110 and other system components for controlling system operations such as X-ray beam formation, data acquisition and/or processing, etc.

Thus, in certain embodiments, the computing device 112 controls system operations based on operator input. To elaborate, the computing device 112 may use the operator-supplied and/or system-defined commands and parameters to operate an X-ray controller 110, which in turn, may control the X-ray tube 104. In this way, the intensity and timing of X-ray beam generation may be controlled. It will also be understood that the rotational speed of an anode target in the X-ray tube may be adjusted by the computing device 112 in conjunction with the X-ray controller 110. The anode target may be a rotational element coupled to a liquid metal bearing assembly.

Various methods and processes may be stored as executable instructions in non-transitory memory on a computing device (or controller) in X-ray system 100. In one embodiment, the X-ray controller 110 may include the executable instructions in non-transitory memory, and may apply the methods to control the X-ray tube 104. In another embodiment, computing device 112 may include the instructions in non-transitory memory, and may relay commands, at least in part, to the X-ray controller 110 which in turn adjusts the X-ray tube output.

FIG. 2 shows a schematic of a vacuum processing assembly 200 used to create a vacuum environment in an X-ray tube insert 202 of the example X-ray tube. The example schematic of FIG. 2 is not drawn to scale and is a general schematic to represent the components of a vacuum processing assembly 200 for creating a vacuum environment within an X-ray tube insert 202 of the example X-ray tube. The example vacuum processing assembly 200 further includes a vacuum pump 204 coupled to the X-ray tube insert 202 via one or more sections of a tube assembly. The vacuum pump 204 creates the vacuum environment during manufacture of the X-ray tube. A first section of tubing or pipe is a vacuum tube 206. Copper is the preferred material of the vacuum tube that is coupled to the X-ray tube insert 202 because copper creates a superior vacuum environment. However, other suitable materials may be used for the vacuum tube 206 instead of copper. A first end of the vacuum tube 206 may be connected to a first end of an extension tube 208 via an adapter 210. The example vacuum tube 206 includes a second end coupled to the X-ray tube insert 202 via a socket 212. A second end of the extension tube 208 is coupled to the vacuum pump via a fitting 214. In the illustrated example, the extension tube 208 allows of the vacuum pump 204 to be positioned further from the X-ray tube insert 202. For example, manufacturing constraints may require a specific length of tubing or piping between the X-ray tube insert 202 and the vacuum pump 204. In alternative examples, the second end of the vacuum tube may be directly coupled to a vacuum pump via the fitting. Various lengths of vacuum tubes 206 or extension tubes 208 may be used to meet manufacturing requirements. Additionally, using an extension tube 208 is advantageous over using a longer vacuum tube 206 because less copper is wasted during manufacture. Furthermore, the extension tube 208 can be attached to the vacuum tube 206 only for the portion of the manufacturing process during which the vacuum environment is created within the X-ray tube insert 202. Thus, the length of tube attached to the X-ray tube insert 202 during the majority of manufacturing time is shorter and easier to maneuver.

The example adapter 210 includes a sleeve portion to join the ends of the vacuum tube 206 and the extension tube 208 in an abutting fashion. In some examples, the diameters of the vacuum tube 206 and the extension tube 208 are different, while in other examples the diameters of the vacuum tube 206 and the extension tube 208 are the same and, thus, the adapter facilitates a solid connection between the two ends. The example adapter may be coupled to the vacuum tube 206 and the extension tube 208 using a suitable means, including brazing and/or welding. The example socket 212 may be coupled to the example X-ray tube insert 202 and/or the example vacuum tube 206 using a suitable means, such as brazing and/or welding. The example fitting 214 may be coupled to the extension tube 208 using a suitable means, including welding, and may be coupled to the vacuum pump 204 using, for example, a plurality of removable fasteners such as bolts, screws or other type of fastener.

FIG. 3A illustrates a partial cross-sectional view of an X-ray tube insert 202 coupled to a vacuum processing assembly 200 according to an embodiment. In the illustrated embodiment, X-ray tube insert 202 includes an anode assembly 306 and a cathode assembly 314. The anode and cathode assemblies 306, 314 are coupled to a support plate or center frame 308 and supported within an enclosure or casing (not shown), which encloses the anode assembly 306, including an anode target and bearing assembly (not shown), and cathode assembly 314. The X-ray tube insert 202 defines an area of relatively low or no pressure (e.g., a vacuum) compared to ambient, in which high voltages may be present. The X-ray tube insert 202 may be positioned within a casing or enclosure (not shown) filled with a cooling medium, such as a dielectric oil, that may also provide high voltage insulation. While the anode target and anode assembly are described above as being a common component of X-ray tube insert 202, the anode target and anode assembly may be separate components in alternative X-ray tube embodiments. The support plate or center frame 308 supports the anode assembly 306 and the cathode assembly 314. The anode and cathode assemblies 306, 314 may be attached to the support plate 308 by brazing and/or welding.

In operation, an electron beam is produced by cathode assembly 314. In particular, cathode assembly 314 receives one or more electrical signals via a plurality of electrical cables, leads or wires. The electrical signals may include power and timing/control signals that cause cathode assembly 314 to emit an electron beam at one or more energies and at one or more frequencies. The electrical signals may also at least partially control the potential between cathode assembly 314 and anode assembly 306. In some embodiments, a cathode cup includes focusing elements that focuses electrons emitted from a filament or other electron emitter within the cathode cup to form an electron beam.

X-rays are produced when high-speed electrons of the electron beam from the emitter of the cathode assembly 314 are suddenly decelerated upon impacting a target track formed on a surface of the anode target within the anode assembly 306. The high-speed electrons forming an electron beam are accelerated toward the anode target via a potential difference therebetween. X-rays are emitted through an X-ray emission window 310 formed in the X-ray tube insert 202 that is positioned toward the X-ray detector 108 of FIG. 1.

Anode assembly 306 includes a rotor and a stator 312 located at one end of the anode assembly 306 for causing rotation of the anode target during operation. The anode target is supported in rotation by a bearing assembly, which, when rotated, also causes the anode target to rotate about a centerline. The anode target has a generally annular shape, such as a disk, and an annular opening in the center thereof for receiving the bearing assembly.

The anode target may be manufactured to include a number of metals or composites, such as tungsten, molybdenum, or any material that contributes to Bremsstrahlung (i.e., deceleration radiation) when bombarded with electrons. The target track of the anode target may be selected to have a relatively high refractory value so as to withstand the heat generated by electrons impacting the target track. Further, the space within the X-ray tube insert 202 and between cathode assembly 314 and anode assembly 306 is at vacuum pressure in order to minimize electron collisions with other atoms and to maximize an electric potential.

To avoid overheating of the anode target when bombarded by the electrons, the rotor rotates the anode target at a high rate of speed (e.g., 90 to 250 Hz) about a centerline. In addition to the rotation of anode target within an anode assembly of an X-ray tube insert, in a CT application, the X-ray tube as a whole is caused to rotate within a gantry (not shown) about an object or subject being imaged at rates of typically 1 Hz or faster.

FIG. 3A also depicts an example vacuum processing assembly 200 for creating a vacuum environment within the X-ray tube insert 202. The example vacuum processing assembly 200 includes a vacuum tube 206, an adapter 210, and an extension tube 208 as described in conjunction with FIG. 2. However, the example extension tube 208 is coupled to a valve 304 using a valve sleeve 302 or adapter. The valve 304 is coupled to the vacuum pump 204. The valve 304 may be opened to enable the vacuum pump 204 to create the vacuum environment within the X-ray tube insert 202. The valve 304 may be coupled to the vacuum pump 204 using any suitable method, including welding or fasteners.

FIG. 3B illustrates an alternative example partial cross-sectional view of an X-ray tube insert 202 coupled to a vacuum processing assembly 200 according to an embodiment. Similar to FIG. 3A, the illustrated embodiment of FIG. 3B, X-ray tube insert 202 includes an anode assembly 306 and a cathode assembly 314.

FIG. 3B also depicts an alternative example vacuum processing assembly 200 for creating a vacuum environment within the X-ray tube insert 202. The example vacuum processing assembly 200 includes the example vacuum tube 206 as described in conjunction with FIG. 2. However, the example vacuum tube is directly coupled to the valve 304 using a valve sleeve 214 or adapter, rather than the vacuum tube 206 being coupled to an adapter 210 and extension tube 208. The valve 304 is coupled to the vacuum pump 204. The valve 304 may be opened to enable the vacuum pump 204 to create the vacuum environment within the X-ray tube insert 202.

Figure 5A:
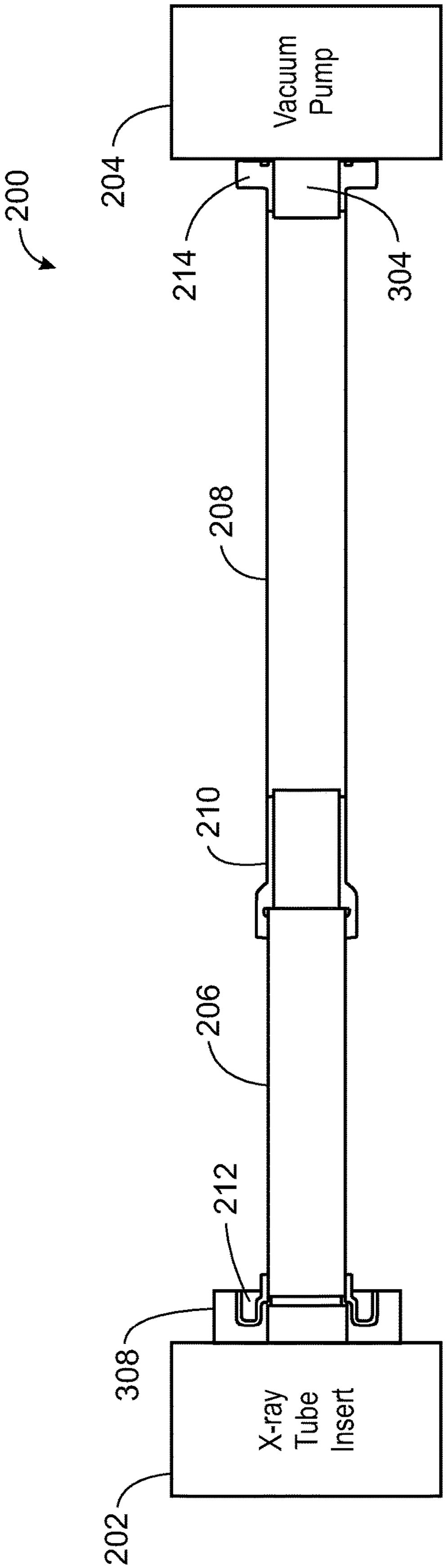
FIGS. 5A and 5B shows cross-sectional views of example vacuum processing assemblies for creating a vacuum in the X-ray tube insert of the X-ray tube.
Figure 5B:
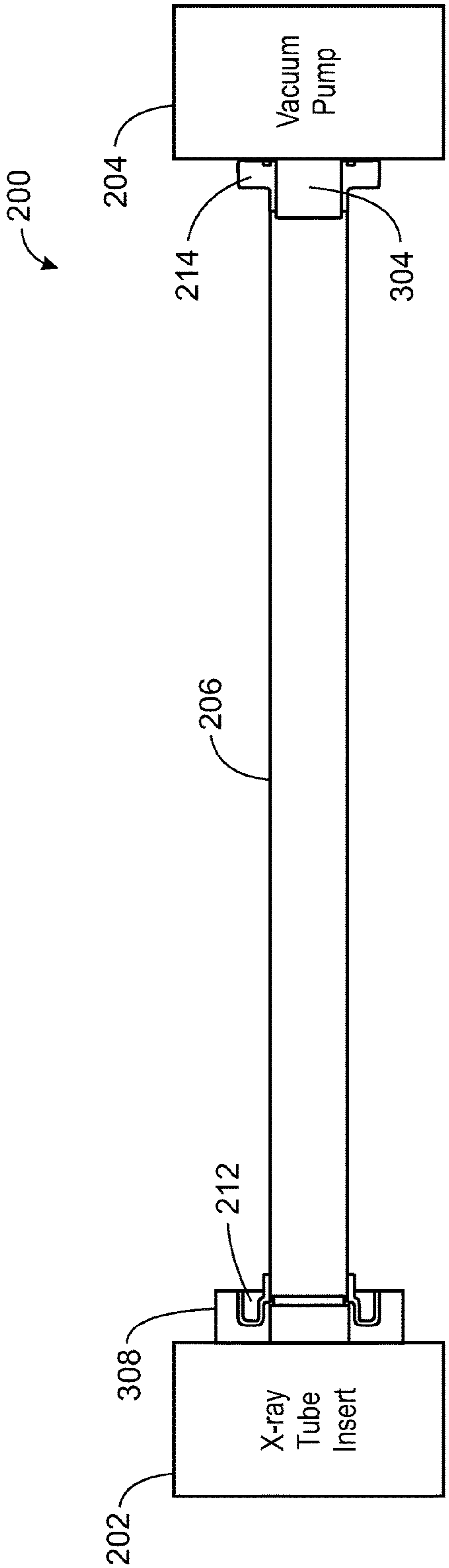

FIGS. 4 and 5A depict a more detailed depiction of the example vacuum processing assembly 200 for creating a vacuum environment within the X-ray tube insert 202 including example embodiments of the vacuum tube 206, the extension tube 208, the adapter 210, the example socket 212, and the example fitting 214. FIG. 5B illustrates an alternative example processing assembly 200. The example vacuum processing assembly 200 includes the example vacuum tube 206. However, the example vacuum tube is directly coupled to the valve 304 using a valve sleeve 214 or adapter, rather than the vacuum tube 206 being coupled to an adapter 210 and extension tube 208. Other example embodiments may include other or additional components that may vary from the components described with respect to the example embodiment of FIG. 4. While in the illustrated example, the vacuum tube 206 is shorter than the extension tube 208, either the vacuum tube 206 or the extension tube 208 may be any length necessary or desired to fit the constraints of the manufacturing environment.

In the example illustrated in FIGS. 4 and 5A, the vacuum tube 206 is coupled to a support plate or center frame 308 of the X-ray tube insert 202 via the socket 212. The example socket 212 includes an annular ring into which the second end of the vacuum tube 206 is inserted. The vacuum tube 206 may be brazed to the annular ring. The annular ring may extend from the surface of the support plate 308. The socket 212 may further include an annular U-shaped portion which may be fitted into a corresponding annular groove of the support plate 308. The U-shaped portion may be welded or otherwise permanently fixed to the support plate. Other configurations of sockets may be used so long as the socket connects the vacuum tube to the X-ray tube insert 202 in a manner which allows the vacuum environment to be created. The example socket 212 is steel (e.g., stainless steel), but other suitable metals may be used instead. FIG. 7 depicts the end of the socket 212 that is welded to the support plate 308 from a perspective of the opposite side of the support plate. In the event that the vacuum environment is disrupted (e.g., dur to damage or wear on the X-ray tube insert) and/or the X-ray tube insert needs to be repaired, the example vacuum tube 206 can be removed and the socket 212 can be machined out so that the X-ray tube insert 202 can be reused with a new vacuum tube section and socket.

The second end of the vacuum tube 206 is brazed to an inner surface of the adapter 210. The example adapter 210 includes a flanged portion adjacent the vacuum tube 206. Additionally, an inner annular groove of the adapter accommodates the brazing of the vacuum tube to the adapter. The example adapter 210 then tapers in the direction of the extension tube 208 to a sleeve portion that has an outer diameter equal to an outer diameter of the majority of the extension tube 208. The end of the extension tube 208 has a slightly smaller diameter so that the extension tube 208 fits within the adapter 210. When the extension tube 208 is inserted in the adapter 210 and prior to the vacuum pump being activated, the extension tube 208 is welded to the adapter 210. After the adapter is detached from the vacuum tube (e.g., after the vacuum tube is pinched off), the adapter can be machined out so the extension tube can be reused, thereby reducing material waste. The example adapter is steel (e.g., stainless steel).

The example fitting 214 is on the second end of the extension tube 208. In some examples, the fitting 214 may be integrated with the extension tube 208. Alternatively, the fitting 214 may be welded or otherwise fastened to the end of the extension tube 208. The example fitting 214 is then removably fastened to the vacuum pump 204. FIG. 6 depicts the end of the fitting 214 including fasteners 602 that may be used to connect the fitting 214 to the vacuum pump 204. The example fasteners are screws, bolts, but any other suitable fastener, such as clips, pins, etc. may be used instead.

FIG. 8A depicts the example vacuum tube 206 that is coupled to the support plate 308 using the socket 212 after the end of the vacuum tube 206 is pinched or cold pressed to seal the vacuum environment of the X-ray tube insert 202. As shown in FIG. 8A, the vacuum tube 206 has been pinched off between the socket 212 and the adapter 210. The vacuum tube 206 can be pinched off anywhere between the socket 212 and the adapter 210 or the vacuum tube 204, thought it may be desired to pinch of the vacuum tube 206 closer to the socket to reduce the amount of tube extending from the X-ray tube insert 202.

FIG. 8B depicts another example vacuum tube 206 after the end of the vacuum tube 206 is pinched or cold pressed to seal the vacuum environment of the X-ray tube insert 202. However, FIG. 8B depicts an example vacuum tube 206 that is coupled directly to the support plate 308, rather than connected to the support plate using the socket 212. As shown in FIG. 8B, the vacuum tube 206 has been pinched off between the socket 212 and the adapter 210. The vacuum tube 206 can be pinched off anywhere between the support plate 308 and the adapter 210 or vacuum pump 204, thought it may be desired to pinch of the vacuum tube 206 closer to the socket to reduce the amount of tube extending from the X-ray tube insert 202.

FIG. 9 shows an example method 900 of creating the example vacuum environment in the X-ray tube insert 202 using the example embodiment described herein. The method 900 begins at block 902 by connecting the vacuum tube 206 and the socket 212 to the support plate 308. The vacuum tube 206 is connected to the support plate 308 early in the manufacturing process. As discussed above, the socket 212 is welded to the support plate 308, and the vacuum tube is brazed to the socket 212. The adapter 210 may also be brazed to the vacuum tube 206 at this time.

Next, when it is time to create the vacuum environment, the extension tube 208 is welded to the adapter 210 (block 904). If the adapter 210 has not yet been coupled to the vacuum tube 206, the adapter 210 is first brazed to the vacuum tube 206. If the fitting 214 is not integrated in the extension tube 208, the fitting 214 is also welded to the extension tube 208.

In block 906, the vacuum pump 204 is coupled to the extension tube 208 via the fitting 214. In the illustrated example of FIGS. 4-7, the fitting 214 is coupled to the vacuum pump 204 using fasteners 602.

In block 908, the vacuum pump is operated to create the vacuum environment within the X-ray tube insert 202. Next, in block 910, the vacuum tube 206 is pinched or cold pressed to seal the vacuum environment within the X-ray tube insert 202. The method 900 is complete.

FIG. 10 shows an example method 1000 of creating the example vacuum environment in the X-ray tube insert 202 using the example embodiment described herein. The method 1000 begins at block 1002 by connecting the vacuum tube 206 and, in some examples, the socket 212 to the support plate 308. The vacuum tube 206 is connected to the support plate 308 early in the manufacturing process. As discussed above, if the vacuum tube 206 is connected to a socket 212, the socket 212 is welded to the support plate 308, and the vacuum tube is brazed to the socket 212.

In block 1004, the vacuum pump 204 is coupled to the vacuum tube 208 via the fitting 214. In the illustrated example of FIGS. 4-7, the fitting 214 is coupled to the vacuum pump 204 using fasteners 602.

In block 1006, the vacuum pump is operated to create the vacuum environment within the X-ray tube insert 202. Next, in block 1008, the vacuum tube 206 is pinched or cold pressed to seal the vacuum environment within the X-ray tube insert 202. The method 1000 is complete.

A technical effect of using the example system for creating a vacuum within the X-ray tube insert is reduction in material waste due to the reusable nature of the extension tube 208 and the socket-ray tube 202. Additionally, using an extension tube instead of a longer vacuum tube reduces copper waste. Using a shorter vacuum tube reduces manufacturing concerns and constraints prior to the vacuum environment being created.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features. As described herein "approximately" and "substantially" refer to values of within plus or minus five percent, unless otherwise noted.

In addition to any previously indicated modification, numerous other variations, alternative arrangements, and embodiments may be devised by those skilled in the art without departing from the spirit and scope of this description, and appended claims are intended to cover such modifications, arrangements, and embodiments. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A system for creating a vacuum in an X-ray tube insert of an X-ray tube, comprising:
- an X-ray tube insert;
- a vacuum tube having a first end and a second end, the first end coupled to the X-ray tube insert;
- a socket to couple the first end of the vacuum tube to the X-ray tube insert;
- an extension tube, the second end of the vacuum tube coupled to the extension tube;
- an adapter to couple the second end of the vacuum tube to the extension tube; and
- a vacuum pump to create the vacuum in the X-ray tube insert, the vacuum pump coupled to the extension tube using a fitting and a plurality of fasteners.

2. The system of claim 1, wherein the extension tube is welded to the adapter.

3. The system of claim 1, wherein the socket is coupled to a support plate of the X-ray tube insert.

4. The system of claim 1, wherein the first end of the vacuum tube is brazed to the socket.

5. The system of claim 1, wherein the second end of the vacuum tube is brazed to the adapter.

6. The system of claim 1, wherein the vacuum tube is copper.

7. The system of claim 1, wherein the socket is stainless steel.

8. The system of claim 1, wherein the adapter is stainless steel.

9. The system of claim 3, wherein the socket is welded to the support plate.

10. A method of creating a vacuum within an X-ray tube insert comprising:
- attaching a first end of a vacuum tube to a socket;

attaching the socket to a support plate of the X-ray tube insert;

attaching an adapter to a second end of the vacuum tube;

attaching an extension tube to the adapter wherein the extension tube is coupled to the vacuum pump using a fitting and a plurality of fasteners;

using a vacuum pump coupled to the extension tube to create a vacuum environment in the X-ray tube insert; and pinching off the vacuum tube between the socket and the adapter to seal the vacuum environment.

11. The method of claim 10, further including coupling the extension tube to the vacuum pump.

12. The method of claim 10, wherein the socket is welded to the support plate.

13. The method of claim 10, wherein the vacuum tube is brazed to the support plate.

14. The method of claim 10, wherein the vacuum tube is brazed to the adapter.

15. An X-ray tube comprising:

an X-ray tube enclosure;

an X-ray tube insert positioned within the X-ray tube enclosure, the X-ray tube insert including a cathode assembly and an anode assembly;

a support plate coupled between the cathode assembly and the anode assembly;

a vacuum tube coupled to the support plate of the X-ray tube insert, wherein the X-ray tube insert includes a vacuum environment, and wherein the vacuum tube is pinched or cold pressed to seal the vacuum environment within the X-ray tube insert, wherein the vacuum tube is welded to the support plate of the X-ray tube insert.

16. The X-ray tube of claim 15, further comprising a socket coupled to the support plate.

17. The X-ray tube of claim 16, wherein the vacuum tube is coupled to the socket.

18. The X-ray tube of claim 16, wherein the socket is welded to the support plate.

19. The X-ray tube of claim 16, wherein the socket is brazed to the vacuum tube.

* * * * *